United States Patent
Hollaender et al.

(10) Patent No.: US 11,527,176 B2
(45) Date of Patent: Dec. 13, 2022

(54) METHOD FOR PROVIDING HOMOLOGATION MARKINGS

(71) Applicant: Robert Bosch GmbH, Stuttgart (DE)

(72) Inventors: Christian Hollaender, Waldbronn (DE); Juergen Hildebrandt, Weilheim (DE)

(73) Assignee: Robert Bosch GmbH, Stuttgart (DE)

( * ) Notice: Subject to any disclaimer, the term of this patent is extended or adjusted under 35 U.S.C. 154(b) by 198 days.

(21) Appl. No.: 16/935,744

(22) Filed: Jul. 22, 2020

(65) Prior Publication Data

US 2021/0074185 A1 Mar. 11, 2021

(30) Foreign Application Priority Data

Sep. 10, 2019 (DE) .......................... 102019213774.1

(51) Int. Cl.
*G09F 3/02* (2006.01)
*G01S 7/02* (2006.01)
*G01S 13/931* (2020.01)

(52) U.S. Cl.
CPC .................. *G09F 3/02* (2013.01); *G01S 7/02* (2013.01); *G01S 7/027* (2021.05); *G01S 13/931* (2013.01); *G09F 2003/0208* (2013.01)

(58) Field of Classification Search
CPC ........................... H05K 1/0266; H05K 1/0275
See application file for complete search history.

(56) References Cited

U.S. PATENT DOCUMENTS

| | | | | |
|---|---|---|---|---|
| 6,249,227 B1* | 6/2001 | Brady | ............... | G06K 19/07749 340/572.1 |
| 6,352,203 B1* | 3/2002 | Brainard | ............... | H01L 23/544 257/E23.179 |
| 6,651,110 B1* | 11/2003 | Caspers | ............... | G06F 3/0481 710/72 |
| 6,896,186 B2* | 5/2005 | Kudo | ...................... | H01L 24/78 257/E23.179 |
| 6,932,272 B1* | 8/2005 | Liu | .................. | G06K 19/06046 235/462.01 |
| 7,291,507 B2* | 11/2007 | Bidermann | ........... | H01L 23/544 438/18 |
| 10,108,925 B1* | 10/2018 | Taylor | ................ | G06Q 30/0185 |
| 11,276,098 B2* | 3/2022 | Klein | ....................... | G06K 7/10 |

(Continued)

OTHER PUBLICATIONS

I. Dita et al., "Data Matrix Code—A Reliable Optical Identification of Microelectronic Components"; proceedings of the 2011 IEEE 17th International Symposium for Design and Technology in Electronic Packaging; pp. 39-44; published by IEEE, Piscataway, NJ, USA; added to IEEE Xplore on Dec. 15, 2011. (Year: 2011).*

*Primary Examiner* — Bernarr E Gregory

(74) *Attorney, Agent, or Firm* — Norton Rose Fulbright US LLP; Gerard Messina

(57) ABSTRACT

A method for providing markings, in particular, homologation markings, of a component, at least one communication element, which is situated on the component or integrated into the component, being read out visually, electronically or electromagnetically, at least one code being ascertained as a result of the read-out of the communication element, and the ascertained code being used for digitally retrieving and outputting the markings of the component. A component system is also described.

8 Claims, 7 Drawing Sheets

(56) References Cited

U.S. PATENT DOCUMENTS

| | | | |
|---|---|---|---|
| 2006/0057762 A1* | 3/2006 | Chen | H01L 25/16 257/E23.176 |
| 2007/0164729 A1* | 7/2007 | Cowburn | G01R 31/31718 324/759.02 |
| 2009/0218401 A1* | 9/2009 | Moran | G06K 19/14 235/487 |
| 2012/0308003 A1* | 12/2012 | Mukherjee | H04L 9/3247 380/243 |
| 2013/0111208 A1* | 5/2013 | Sabin | H04W 12/069 713/176 |
| 2015/0102105 A1* | 4/2015 | Perret | G06K 19/06056 235/440 |
| 2016/0321677 A1* | 11/2016 | Dobaj | G06Q 30/0185 |
| 2017/0091504 A1* | 3/2017 | Tonnelier | G06K 7/1413 |
| 2018/0005096 A1* | 1/2018 | Friedman | G06K 19/06056 |

\* cited by examiner

METHOD FOR PROVIDING HOMOLOGATION MARKINGS

CROSS REFERENCE

The present application claims the benefit under 35 U.S.C. § 119 of German Patent Application No. DE 102019213774.1 filed on Sep. 10, 2019, which is expressly incorporated herein by reference in its entirety.

FIELD

The present invention relates to a method for providing markings, in particular, homologation markings, to a component, as well as to a component system.

BACKGROUND INFORMATION

As a result of vehicles being increasingly equipped with automation functions, safety functions and comfort functions, the number of installed components is on the rise. Such components may be sensors and control units, for example. Radar sensors are predominantly used to implement adaptive cruise control and emergency braking assistance systems, for example. The radar sensors emit high-frequency electromagnetic waves via an antenna structure, and receive the portions of the electromagnetic waves reflected at objects. With the aid of the received waves, it is possible to calculate the distance and the direction in relation to the object. Moreover, the relative velocity of an object in relation to the radar sensor may be calculated. The majority of radar sensors are operated in a worldwide regulated frequency range between 76 and 77 GHz.

For example, due to the emission of high-frequency radar beams, radar sensors are subject to a country-specific homologation process. The corresponding country-specific homologation markings have to be situated on the radar sensor, for example, in the form of a label. Comparable requirements are placed on other components, such as LIDAR sensors.

Homologation markings are usually engraved by laser onto a housing or a marking tag. If such components are increasingly sold and homologated in further countries, an adaptation of the laser marking and a corresponding camera-based monitoring are necessary. Such a change of the laser marking, however, is complex with an increasing number of homologation markings and cannot be implemented on a daily basis.

SUMMARY

An object of the present invention is to create a method for providing markings, which may be updated in a technically simple and quick manner.

This object may be achieved using example embodiments of the present invention. Advantageous embodiments of the present invention are described herein.

According to one aspect of the present invention, a method for providing markings, in particular, homologation markings, of a component is provided.

In one step, at least one communication element, which is situated on the component or integrated into the component, is read out visually, electronically or electromagnetically. The communication means may preferably be configured to be machine-readable.

Thereafter, at least one code is ascertained as a result of the read-out of the communication element. The ascertained code is used for digitally retrieving and outputting the markings of the component. Different country-specific markings and pieces of information about the component may be digitally provided in the process. In particular, the code may be used to carry out an output on a display. For example, a website including data relevant for the marking may be retrieved on a display of a vehicle or of a portable device with the aid of the code. A portable display may, for example, be a smart phone, a tablet or a notebook.

The component may, in particular, be configured as a control unit or a sensor, such as a LIDAR sensor, a radar sensor, an ultrasonic sensor, a camera sensor, a GNSS sensor and the like.

As a result of the example method, it is possible to replace existing country-specific homologation markings or homologation markings with a machine-readable communication element using an appropriate link, for example to a website or a cloud. The communication element may advantageously remain unchanged in the case of changes of the homologation markings. All changes may be implemented in a centralized manner by adapting the website or the cloud, by which a manufacturing process of the component remains unchanged.

The communication element usually includes a visible or an invisible code. The code may be executed by a machine by the evaluation of a sensor system or a reading device or by a keyboard input. The ascertained or executed code is used to establish a data link or to retrieve data. The up-to-date markings of the component may be displayed in the process.

Due to the use of a machine-readable communication element having a link to centrally managed homologation markings, a cost savings and a reduction in the manufacturing complexity of the component may be achieved. In the case of changes of the homologation markings, only one number may be published on the website or in the cloud. The communication element or communication means on the component remains unchanged in the process. In this way, homologation markings may be provided in an up-to-date manner.

The marking may preferably include component-specific pieces of information about permits, quality seals, usage parameters or operating parameters, legal provisions, boundary conditions and the like. Furthermore, testing organizations, registration offices and quality seals may be an integral part of the marking. In this way, for example, a quick overview of the countries may be provided in which the component is permitted and legally operable.

According to one specific embodiment of the present invention, the code is configured as an Internet address, an IP address, or an object identifier. Based on an Internet address, for example, pieces of information about the marking of the component which are stored on a centrally managed website may be retrieved or loaded. If the component is connected by an Ethernet connection, the component and, in particular, a component-internal memory may be linked with the aid of an IP address. In this way, a read access to a component-internal memory may be provided via the IP address. Pieces of information about the markings of the component may be received within a CAN bus system via an object identifier.

According to one further exemplary embodiment of the present invention, the marking of the component is retrieved, based on the ascertained code, as pieces of information of a website, as an externally stored file or as component-internally stored data. The code is thus used as a machine-executable link to a website or a file. The corresponding website or file may be retrieved by execution of the code and be visually represented. A website may be decoded and subsequently retrieved, for example, by a scanning of a QR code, to learn all relevant homologation markings of the component.

According to one further specific embodiment of the present invention, the communication element is configured as a piece of visual information in the form of a QR code situated on the component, as a data matrix code, as a bar code or in the form of an Internet address, the communication element being optically read out by a scanner or a user. As a result of this measure, an optically readable link may be provided, with the aid of which a centrally maintained website or file is retrievable. In this way, only the communication element has to be created or provided during the manufacture of the component. A subsequent change of the communication element may thus be dispensed with. Since such communication elements are created by printing processes, stamping processes or by laser marking processes, a complex change due to additional homologation markings may be dispensed with. If the component is homologated in different countries, corresponding homologation markings are implemented in the target file or the target address. In this way, only one website or one file is changed. A change in the production chain of the component is thus no longer necessary.

According to one further exemplary embodiment of the present invention, the communication element is configured as an RFID transponder or an NFC transponder, the communication element being read out by a reading device for ascertaining the code. For this purpose, the RFID transponder or the NFC transponder may include a URL, which may be decrypted by the reading device and retrieved. For example, an NFC-capable smart phone may be used as the reading device to ascertain the code, and thus the Internet address, of the communication element. The website resulting from the code or file stored online may subsequently be retrieved for representing the homologation markings. The files stored online may, for example, be stored on a cloud. Such an RFID transponder or NFC transponder may be attached to a housing of the component or be integrated into the housing of the component. This may take place, for example, by a casting or bonding of the transponder to the housing. As an alternative or in addition, such a transponder may be positioned on a circuit board within the housing.

According to one further exemplary embodiment of the present invention, the communication element is configured as a component-internal memory, the communication element being read out by a multimedia interface and/or by an onboard diagnostic device and represented. For this purpose, an Ethernet connection or a CAN bus connection may be established to the component, by which the data, including homologation markings, stored in the component-internal memory are stored. This may be, in particular, advantageous in vehicle-side components. An update or a completion of the homologation markings may, for example, take place quickly and in an uncomplicated manner with the aid of vehicle updates, the component-internal memory being re-written during such a vehicle update.

According to one further aspect of the present invention, a component system is provided. The component system includes a component including a housing, and at least one communication element for providing markings of the component using a method according to the present invention. The communication element is integrated into the component or situated at the housing of the component.

A homologation marking may be linked to the component by the communication element, which may be changed or updated in a technically simple and quick manner. For example, additional homologation markings may be necessary in the course of a multi-country permission of the component, by which the component is designated. Such a subsequent application of homologation markings may take place centrally and be retrieved by the communication element.

According to one exemplary embodiment of the present invention, the component is configured as a control unit, or as a sensor, in particular, as a radar sensor. The component may furthermore be configured as a LIDAR sensor, a radar sensor, an ultrasonic sensor, a camera sensor, a GNSS sensor and the like. The component is generally not limited to sensors or control units. Rather, the component may also be a device, a vehicle, a unit and the like.

Preferred exemplary embodiments of the present invention are described in greater detail hereafter based on highly simplified schematic representations.

DETAILED DESCRIPTION OF EXAMPLE EMBODIMENTS

Figure 1:
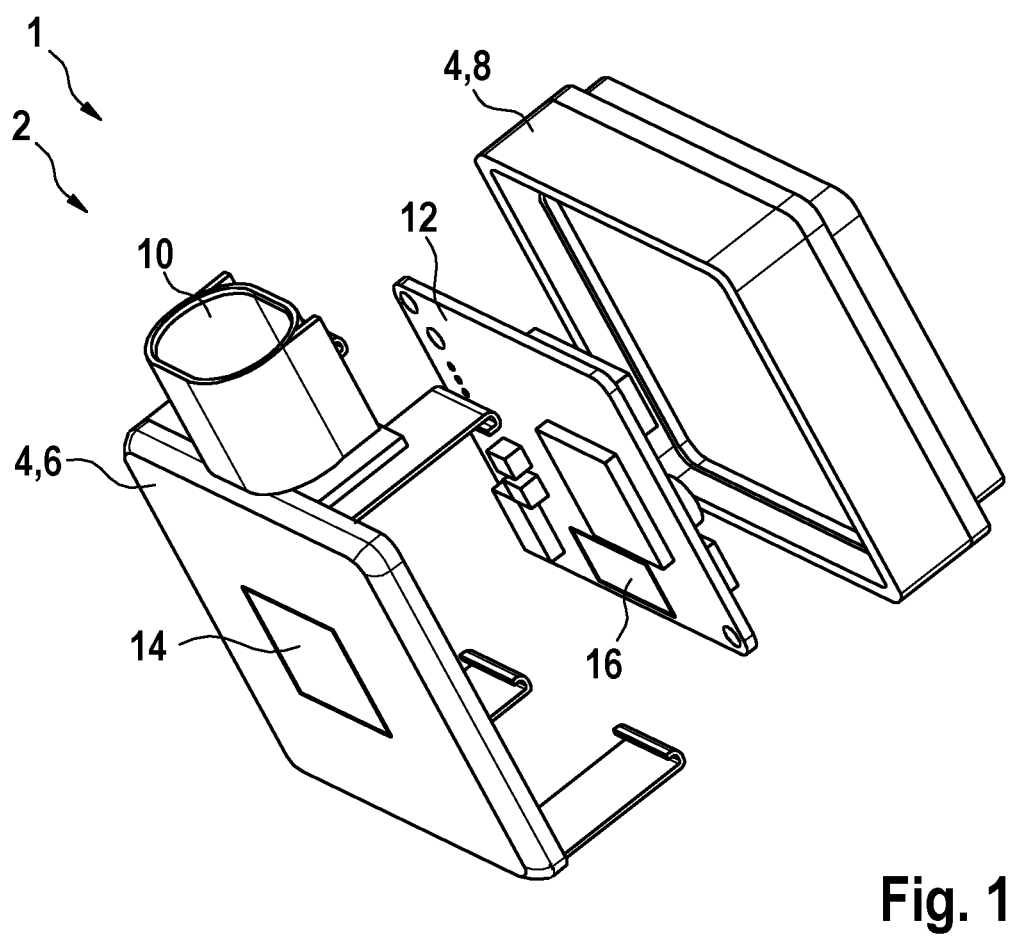
FIG. 1 shows a schematic exploded view of a component system according to one specific embodiment of the present invention.

FIG. 1 shows a schematic exploded view of a component system 1 according to one specific embodiment according to the present invention. Component system 1 includes a component 2, which is configured as a radar sensor by way of example.

Component 2 includes a housing 4, which is divided into two housing halves 6, 8. Housing 4 includes a terminal 10 for the energy-conducting and data-conducting connection of component 2.

Terminal 10 is connected to a circuit board 12 or a functional unit of component 2. Circuit board 12 may, for example, include a receiving antenna and a transmitting antenna including corresponding electronic activation.

Component system 1 furthermore includes a communication element 14, 16. Communication element 14, 16 may be configured as a visible communication element 14 or as a non-visible communication element 16.

A visible communication element 14 may, for example, be situated on a first housing half 6. A non-visible communication element 16 may, for example, be electronically or electromagnetically readable and integrated into housing 4 or be positioned on circuit board 12.

Figure 2:
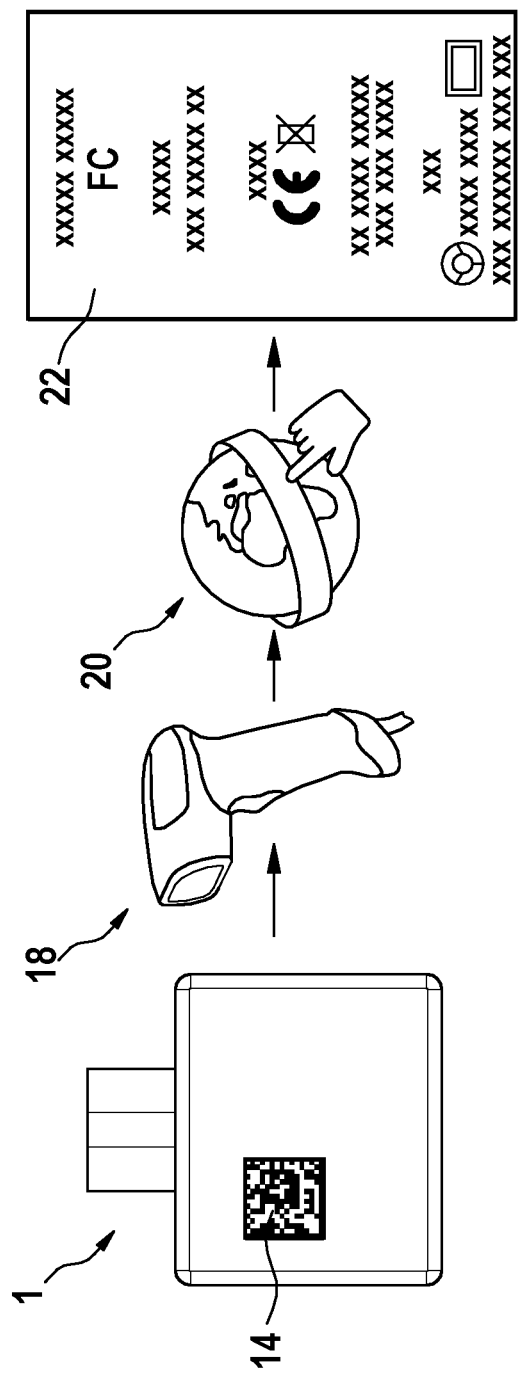
FIG. 2 shows a schematic process to illustrate a method according to a first specific embodiment of the present invention.

FIG. 2 shows a schematic process to illustrate a method according to a first specific embodiment. Communication element 14 is designed to be visible here and positioned on housing 4 of component system 1. Communication element 14 is configured as a QR code or as a data matrix code and may be read by a reading device 18 and evaluated. As a result of the read-out of communication element 14, a code 20, for example in the form of an Internet address, may be ascertained by reading device 18, and a website may be retrieved, on which homologation markings 22 are listed in an up-to-date manner.

Figure 3:
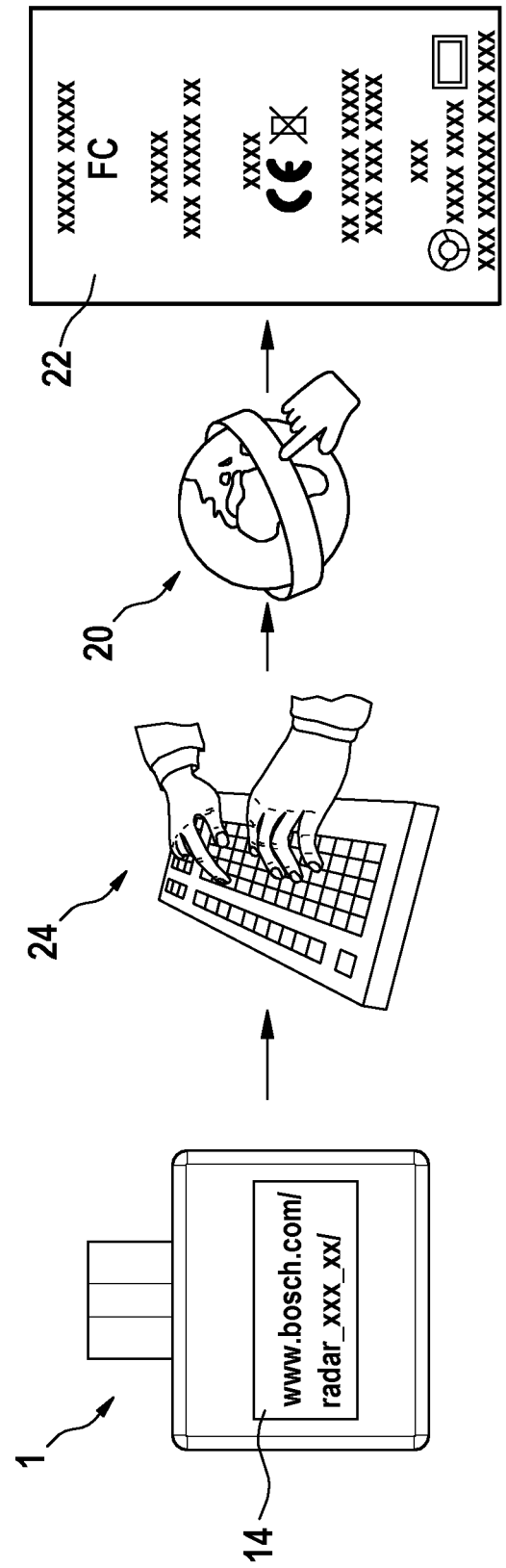
FIG. 3 shows a schematic process to illustrate a method according to a second specific embodiment of the present invention.

FIG. 3 shows a schematic process to illustrate a method according to a second specific embodiment. In contrast to the first specific embodiment, communication element 14 is configured as an Internet address or a URL. The URL serves as code 20 and may be entered into an address line of an Internet browser to retrieve a website including homologation markings 22. The entry of the Internet address may, for example, take place by a user 24 or by a machine text recognition or a so-called OCR.

Figure 4:
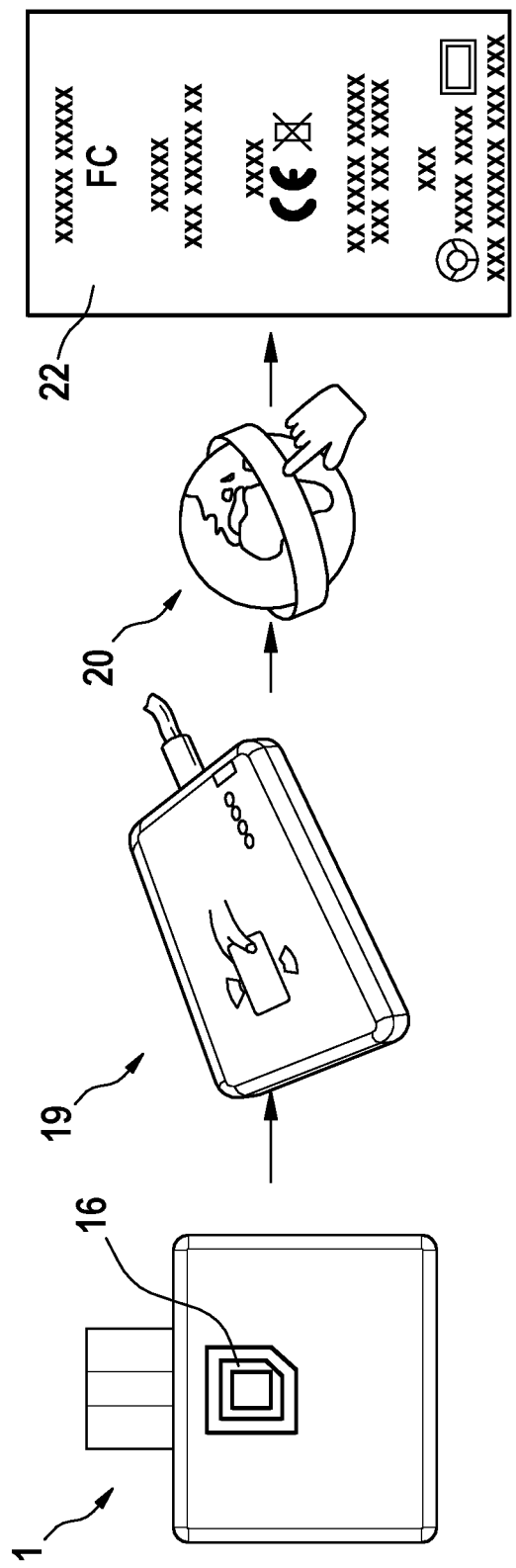
FIG. 4 shows a schematic process to illustrate a method according to a third specific embodiment of the present invention.

FIG. 4 shows a schematic process to illustrate a method according to a third specific embodiment. Communication element 16 is designed as a non-visible communication element 16 in the form of an RFID transponder here. Communication element 16 is integrated into housing 4 of component 2 here, or bonded to housing 4.

RFID transponder 16 is read out by a reading device 19, which may be an RFID scanner, and a code 20 in the form of an Internet address is ascertained. The ascertained Internet address may be subsequently retrieved for displaying one or multiple homologation marking(s).

Figure 5:
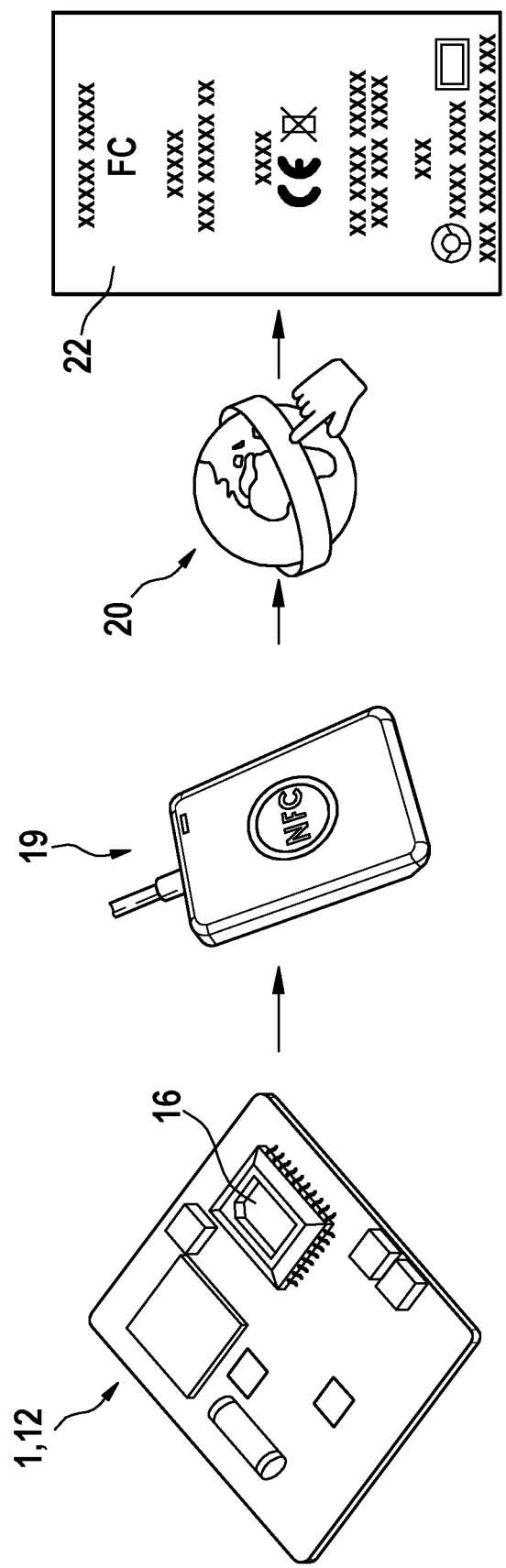
FIG. 5 shows a schematic process to illustrate a method according to a fourth specific embodiment of the present invention.

FIG. 5 shows a schematic process to illustrate a method according to a fourth specific embodiment. In contrast to the exemplary embodiments already described, communication element 16 is designed as an NFC transponder or a chip, which is positioned on circuit board 12 of component 2. Communication element 16 may be read out by an electromagnetic scanner 19, and a code 20 in the form of an Internet address or a download link to a file may also be ascertained. Thereafter, code 20 may, for example, be retrieved by a portable device or a computer to display homologation markings 22.

Figure 6:
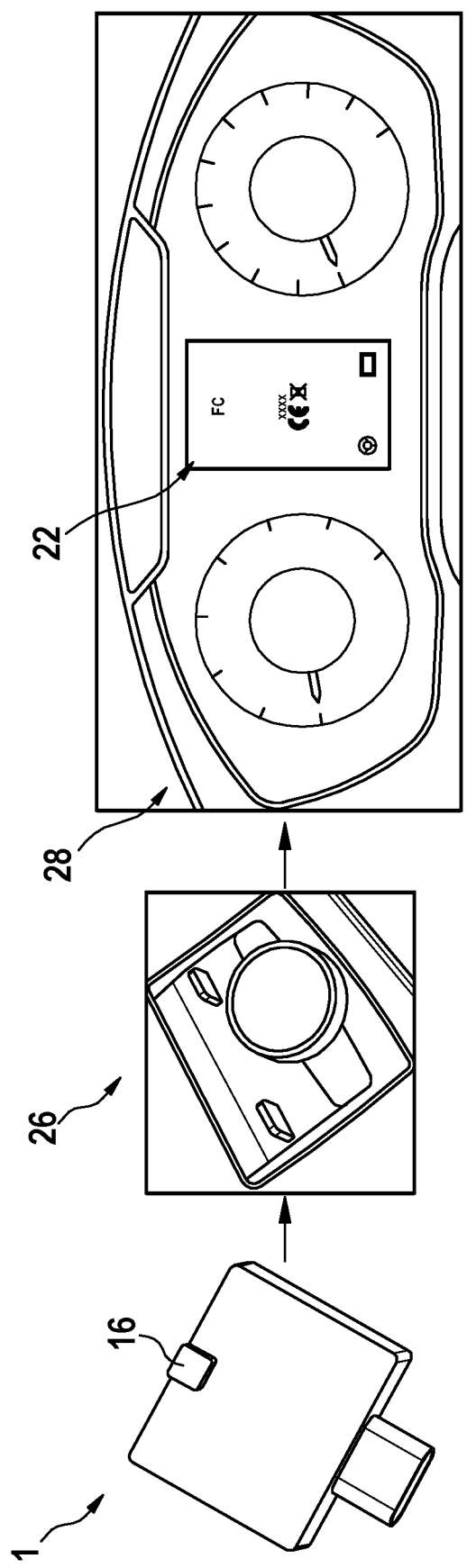
FIG. 6 shows a schematic process to illustrate a method according to a fifth specific embodiment of the present invention.

FIG. 6 shows a schematic process to illustrate a method according to a fifth specific embodiment. In the present exemplary embodiment, communication element 16 is designed as a component-internal memory and also positioned on circuit board 12. Component 2 may be situated in a vehicle in the process and be read out with the aid of a so-called multimedia interface 26 of the vehicle.

The display of homologation marking 22 may, for example, take place by a vehicle display 28, such as a cockpit display or a central display.

Communication element 16 designed as a component-internal memory may be read out with the aid of multimedia interface 26, similarly to the read-out of a vehicle identification number. Codes 20, including homologation markings 22, stored in communication element 16 may be updated by vehicle updates, such as a so-called software flash over the air process.

Figure 7:
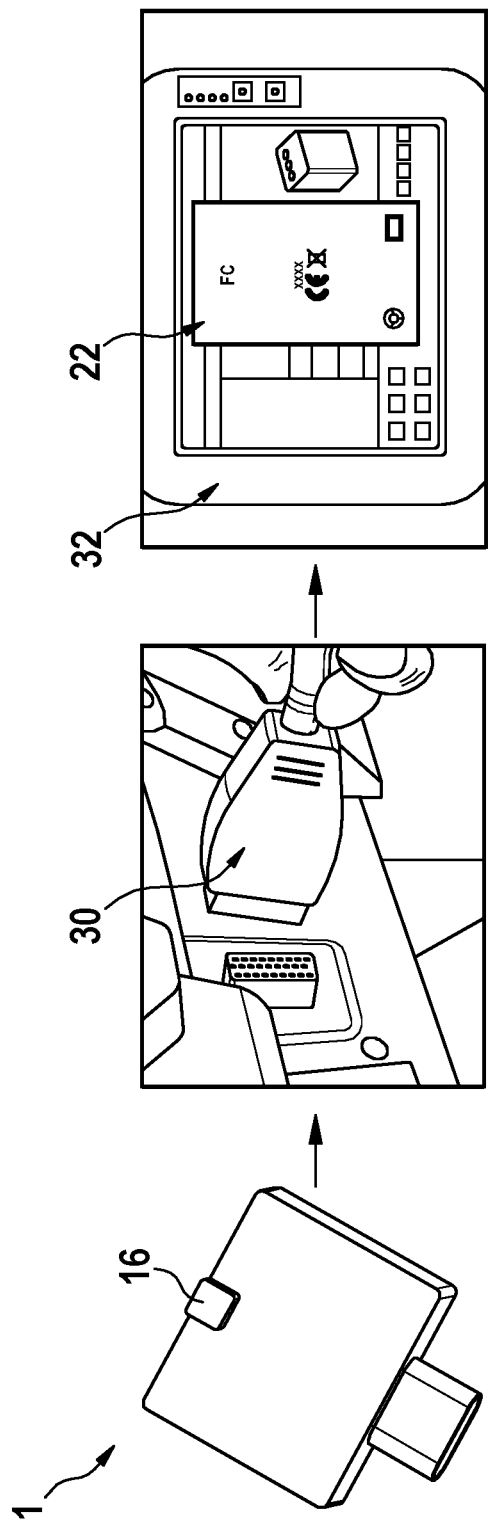
FIG. 7 shows a schematic process to illustrate a method according to a sixth specific embodiment of the present invention.

FIG. 7 shows a schematic process to illustrate a method according to a sixth specific embodiment. As an alternative or in addition to the exemplary embodiment shown in FIG. 6, communication element 16 is designed as a component-internal memory. Homologation markings 22 may be retrieved via a CAN bus interface of an onboard diagnostic device 30, such as an OBDII interface of the vehicle.

The display of homologation markings 22 may subsequently take place by a screen 32 of a diagnostic device, or by a screen of a portable device, such as a tablet coupled to interface 30 via BLUETOOTH® technology, which uses radio waves for wireless transmission.

What is claimed is:

1. A method comprising:
electronically or electromagnetically reading out, by a multimedia interface or a vehicle diagnostic device, data of a memory situated on or integrated in a component;
ascertaining at least one code from the data that has been read out of the memory; and
displaying on a screen a first representation of the ascertained at least one code;
wherein the component is integrated in a vehicle, and the method further comprises obtaining, by software of the vehicle, a wireless update by which the data of the memory is additionally updated so that a second representation that is subsequently displayed based on the reading out of the data is different than the first representation.

2. The method as recited in claim 1, wherein the first representation is at least one homologation marking.

3. The method as recited in claim 1, wherein the at least one code is configured as an Internet address or an object identifier.

4. The method as recited in claim 1, wherein pieces of information of a web site or of an externally stored file is obtained based on the at least one code, and the first representation is generated based on the pieces of information.

5. The method as recited in claim 1, wherein the screen is part of an instrument cluster of the vehicle.

6. The method as recited in claim 1, wherein the screen is part of a portable component of the diagnostic device.

7. A component system comprising:
a component including a housing;
a memory integrated in the housing;
a multimedia interface or a vehicle diagnostic device; and
a screen;
wherein:
the multimedia interface or the vehicle diagnostic device is configured to:
electronically or electromagnetically read out data stored on the memory;
ascertain at least one code from the data that has been read out of the communication element memory; and
display on the screen a first representation of the ascertained at least one code;
the component is integrated in a vehicle configured for software of the vehicle to obtain a wireless update by which the data of the memory is additionally updated so that a second representation that is subsequently displayed based on the reading out of the data is different than the first representation.

8. The component as recited in claim 7, wherein the component is a control unit, or a sensor, or a radar sensor.

* * * * *